INVENTOR.
GEORGE V. WOODLING
BY
Woodling, Krost, Granger and Rust
attys.

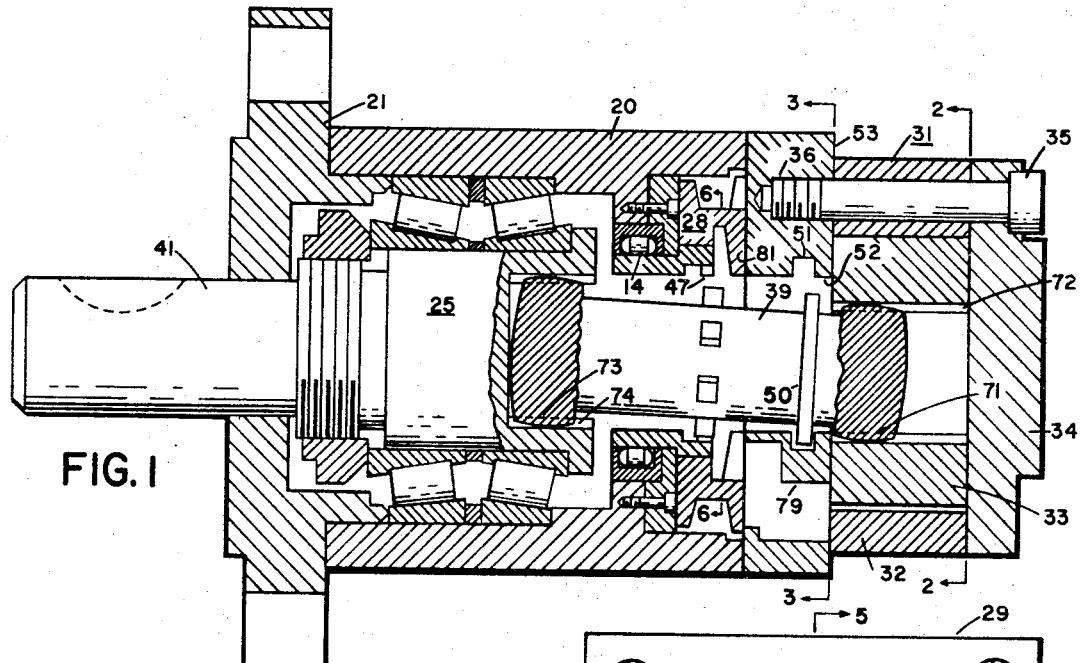
FIG. 1
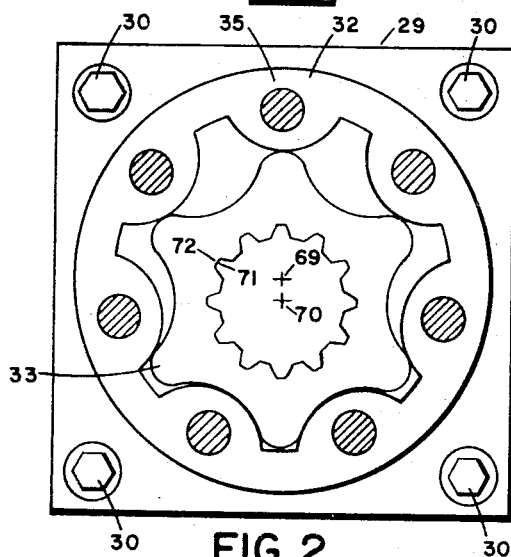
FIG. 2
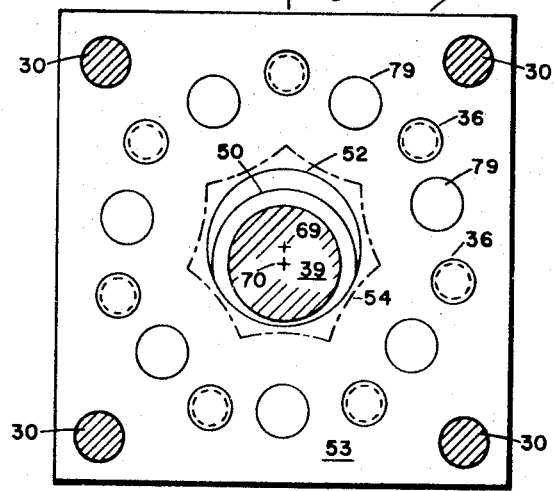
FIG. 3
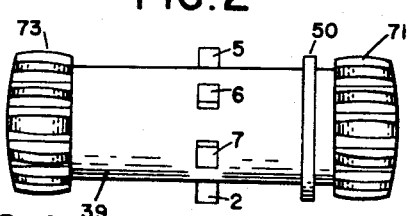
FIG. 4
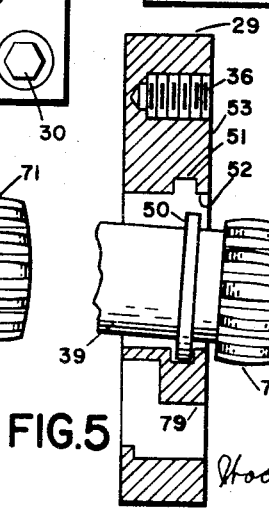
FIG. 5
FIG. 6
INVENTOR
BY GEORGE V. WOODLING Dec. 22, 1970  G. V. WOODLING  3,549,285
STATOR-ROTOR MECHANISM HAVING A POLYGON
SHAFT AND POLYGON SHAFT OPENING
Filed March 7, 1969  2 Sheets-Sheet 2

United States Patent Office 3,549,285
Patented Dec. 22, 1970

1

3,549,285
STATOR-ROTOR MECHANISM HAVING A POLYGON SHAFT AND POLYGON SHAFT OPENING
George V. Woodling, 22077 W. Lake Road, Rocky River, Ohio 44116
Filed Mar. 7, 1969, Ser. No. 805,272
Int. Cl. F01c 1/02
U.S. Cl. 418—61                                   12 Claims

ABSTRACT OF THE DISCLOSURE

The stator-rotor mechanism includes stator and rotor means and a shaft having an operative connection with the rotor means. The operative connection of the shaft to the rotor means comprises female spline teeth in the rotor means and male spline teeth on the shaft. A rotary valve is disposed to control the entrance of fluid to and the exit of fluid from the stator-rotor mechanism. The stator and rotor means respectively have stator and rotor side face means disposed substantially in the same plane. A side member (stationary valve) has a face wall means held in facing relation to said stator and rotor side face means. The side member has a polygon shaft opening. The shaft has a shaft portion extending through the polygon shaft opening. The shaft portion has a polygon cross-section confronting the polygon shaft opening and effects a confining wall relationship therebetween which may be utilized to self-time the rotary valve relative to the rotor means. The polygon shaft portion is stronger than what an otherwise circular shaft portion would be for transmitting increased torque. Accordingly, the present invention provides for maximizing the size of the shaft at a place where the limitations arising from the geometry of the stator-rotor mechanism are the most demanding.

BACKGROUND OF THE INVENTION

In a stator-rotor mechanism having stator and rotor means, a shaft is disposed to extend through a shaft opening in a stationary valve member and then make an operative connection with the rotor means. A rotary valve driven by the shaft is disposed to control the entrance of fluid to and the exit of fluid from the stator-rotor mechanism. The rotor means has a combined rotor movement comprising an orbital and a rotational movement. Being connected to the rotor means, the shaft also has a combined movement partaking that of said rotor means. Due to the combined shaft movement, the shaft has to be considerably smaller than that of the shaft opening. On the other hand, the size of the shaft opening is limited by the geometry of the stator-rotor mechanism and cannot be unduly enlarged, because fluid leakage will occur through the shaft opening if made too large. In short, the output of a stator-rotor mechanism is limited by the size of the shaft opening and by the size of the shaft which can orbit within the shaft opening.

Accordingly, it is an object of my invention to provide a polygon shaft and a polygon shaft opening, without incurring fluid leakage.

Another object is to utilize the combined orbital and rotational movement of the shaft as an advantage to provide a confining wall relationship between the shaft and the shaft opening, whereby both the shaft and the shaft opening may be effectively increased (maximized) in size.

Another object is to utilize the confining wall relationship between the shaft and the shaft opening as a means to insure correct timing of the rotary valve relative to the rotor means.

2

SUMMARY OF THE INVENTION

The invention constitutes a stator-rotor mechanism including stator and rotor means and a shaft connected to said rotor means, said stator means having a stator axis and ($n$) number of internal teeth, said rotor means having a rotor axis disposed for orbital movement about said stator axis and having ($n-1$) number of external teeth intermeshing with said internal teeth of said stator means, said rotor means being also disposed for rotational movement about its own rotor axis, whereby said rotor means has a combined rotor movement comprising said orbital and rotational movements, said intermeshing teeth upon relative movement therebetween defining operating fluid chambers, said stator and rotor means respectively having stator and rotor side face means disposed substantially in the same plane, side member means having face wall means held in facing relation to said stator and rotor side face means, said rotor external teeth having profile edge means slidably engaging said face wall means and slidably defining therewith a polygon sealing juncture configuration having ($n$) number of polygon sealing edges, said side member means having a polygon shaft opening with a reference axis substantially in axial alignment with said stator axis, said shaft having a shaft portion extending through said shaft opening and having an operative connection with said rotor means, said shaft portion having a combined shaft movement partaking that of said combined rotor movement and including an orbital movement about said reference axis of said shaft opening, said polygon shaft opening having ($n$) number of internal wall surface portions defining with said face wall means a polygon boundry edge configuration having ($n$) number of polygon boundry edges, said polygon boundry edge configuration being disposed inwardly of and spaced from said polygon sealing juncture configuration, whereby the sealing space therebetween constitutes peripheral sealing means for sealing fluid in said operating fluid chambers upon relative movement between said stator and rotor means.

Other objects and a fuller understanding of this invention may be had by referring to the following description and claims, taken in conjunction with the accompanying drawings, in which:

FIG. 1 is an elongated view, partly in section, of an orbital fluid pressure device embodying the features of my invention;

FIG. 2 is a view taken along the line 2—2 of FIG. 1 under the end cap, showing the stator-rotor mechanism;

FIG. 3 is a view taken along the line 3—3 of FIG. 1, showing the stator-rotor side of a stationary valve member, the orbital shaft being shown in section;

FIG. 4 is a side view of the orbital shaft;

FIG. 5 is a cross-sectional view taken along the line 5—5 of FIG. 3, showing the right-hand end portion of the orbital shaft orbitally disposed in a centrally disposed shaft opening in the stationary valve member;

FIG. 6 is a view looking at the right-hand side of the drive means between the orbital shaft and the rotary valve in FIG. 1, taken along the line 6—6 thereof, showing six regional drive locations;

DESCRIPTION OF THE PREFERRED EMBODIMENT

Figure 7:
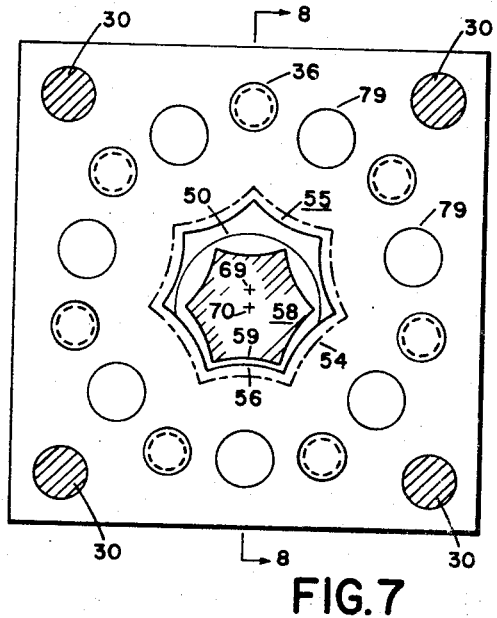
FIG. 7 is a side view of a stationary valve, taken along the line 3—3 of FIG. 1, showing the improvement of a polygon shaft section orbiting within a polygon shaft opening.
Figure 8:
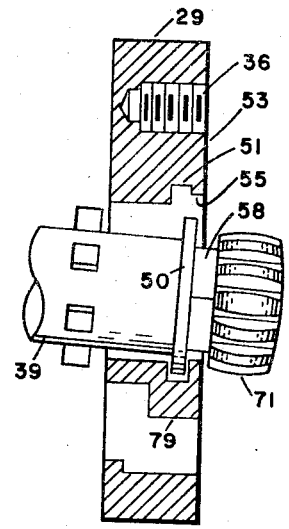
FIG. 8 is a view similar to FIG. 5, with the polygon shaft section and the polygon shaft opening incorporated therein.

The figures of the drawing show a preferred embodiment of the invention but this is only by way of illustration; it is not to be taken as limiting, the invention being limited only by the hereinafter appended claims.

With reference to the drawings, the construction of my orbital fluid pressure device comprises generally a main housing 20 having substantially a square cross-section. A mounting flange 21 is secured to the left-hand end of the housing. The housing 20 is hollow from end-to-end. Rotatively mounted in the left-hand end portion of the housing is a main shaft 25 having an axis substantially coinciding with the fixed axis. As illustrated, the main shaft 25 is rotatively mounted in tapered roller bearings. An external shaft 41 comprises an integral part of the main shaft 25. A rotary valve 28, rotatively mounted on bearings 14, is mounted in the right-hand end portion of the main housing 20 and sealingly engages a stationary face 81 of a stationary valve member 29 connected to the right-hand end face of the main housing by screws 30. Attached to the right-hand face wall means 53 of the stationary valve member 29, is a stator-rotor mechanism 31 comprising stator means 32 and rotor means 33. An end cap 34 encloses the stator-rotor mechanism. As illustrated, screws 35 secure the stator-rotor mechanism and the end cap 34 to the stationary valve member 29. The screws 35 threadably engage threaded holes 36 in the stationary valve member. Although not limited thereto, the stator has seven internal teeth and the rotor has six external teeth intermeshing with the stator internal teeth. The stator may be described as having (n) number of internal teeth and the rotor may be described as having (n—1) number of external teeth. The intermeshing teeth upon relative movement therebetween define operating fluid chambers. The rotor has an axis 70 which orbits about the fixed axis 69 of the stator. The rotor 33 also rotates about its own axis. The stator internal teeth constitutes outer wall means of the operating fluid chambers. The rotor external teeth constitute inner wall means of the operating fluid chambers. The rotation of the rotary valve 28 relative to the stationary valve 29 controls the entrance of fluid to and the exit of fluid from the operating fluid chambers through fluid passages 79 in the stationary valve member 29. The rotary valve 28 is driven by a wobble or orbital shaft 39 which also interconnects the main shaft 25 and the rotor 33. As shown in FIG. 1, the right-hand end portion of the wobble shaft 39 extends through a shaft hole 52 in the stationary valve member 29 and has an operative connection with the rotor 33. The shaft hole 52 has a reference axis substantially in axial alignment with the fixed axis of the stator. Thus, the axis of the wobble shaft 39 orbits around the reference axis, the same as the rotor axis orbits around the stator axis. The operative connection comprises male spline teeth 71 on the wobble shaft which interfittingly engage female spline teeth 72 in the rotor. Thus, the right-hand end portion of the wobble shaft 39 is disposed for rotational movement about its own axis and for orbital movement about the fixed axis of the stator. The connection means between the left-hand end portion of the wobble shaft and the main shaft 25 comprises male spline teeth 73 on the wobble shaft which interfittingly engage female spline teeth 74 in the central core of the main shaft. Thus, the left-hand end portion of the wobble shaft is disposed for rotational movement only about the fixed axis of the stator.

The wobble shaft 39 is connected to drive the rotary valve 28 through one rotation for each rotation of the wobble shaft. The drive is shown in FIG. 6 and may be substantially the same as that shown and described in FIGS. 16–18 in my pending application, Ser. No. 797,223, filed Feb. 6, 1969. The drive means comprises a plurality of drive follower means B to G disposed at circumferentially spaced regional locations internally of the rotary valve and a plurality of drive actuating means 2 to 7 circumferentially disposed about the orbital shaft 39. The drive follower means B to G are circumferentially disposed with reference to the stator axis about which the rotary valve rotates and the drive actuating means 2 to 7 are circumferentially disposed with reference to the shaft axis. The drive follower means B to G comprise female wall means in the form of substantially a semi-circle provided in an internal rim 47 within the rotary valve. The drive actuating means 2 to 7 comprise male wall means in the form of lugs provided on the outside of the actuating shaft. The diameter of the top of the lugs may be substantially the same as the diameter of the male gear teeth 71 and 73, whereby the lugs as well as the male gear teeth may pass through the central opening in the stationary valve and in the rotary valve. The female wall means and the male wall means are preferably six in number, being the same in number as the external teeth of the rotor 33 and may be designated as (n—1) in number. The female wall means are circumferentially spaced apart from each other at substantially equal intervals (sixty degrees) about the fixed axis and the male wall means are circumferentially spaced apart from each other at substantially equal intervals (sixty degrees) about the shaft (second) axis. The drive actuating means 2 to 7 (male wall means) and the drive follower means B to G (female wall means) respectively engage each other in successive order at the regional locations with the respective drive means at each regional location constituting a pair of regional drive means for transmitting a torque therebetween in response to the combined movement of the orbital shaft 39.

The drive means thus described constitutes universal drive means and provides for rotating the rotary valve means relative to the stationary valve means once for each rotation of the wobble shaft 39. The operation of the rotary valve means is independent of the load and thrust on the main shaft. The fluid may flow through the drive means as open spaces are needed to accommodate for the flow of fluid therethrough.

Relative axial movement may occur between the male and female spline teeth connections, and in this application, confinement or axial limit means are provided to limit such relative axial movement. In FIGS. 4 and 5, the confinement means comprises abutment means in the form of an annular shoulder 50 on the wobble shaft 39 which is disposed to orbitally fit within an annular recess 51 provided inside of a centrally disposed shaft hole 52 in the stationary valve member 29, see FIG. 5. The interengagement between the side walls of the shoulder 50 and the side walls of the recess 51 limits the relative axial movement between the male and female spline teeth.

The orbital shaft 39 may be inserted in the hole 52 of the rotary valve 29 in the normal manner without any obstruction from the annual shoulder 50, since its outside diameter is less than the diameter of the hole 52. It is the orbital position of the rotor means 33 which holds the annular shoulder 50 within the recess 51. There is always at least some portion of the annular shoulder 50 engaging a side wall of the recess 51. This interengagement of the side walls limits the extent that the orbital shaft may move in an axial direction and makes it possible to interchange stator-rotor mechanism of variable width. Thus, if it were not for my axial limit means, it would be possible for the orbital shaft 39 to work its way to the right in FIG. 1 until it hit the end cap 34, thereby causing the male and female spline teeth 73 and 74 to lose their full engagement width for transmitting full torque to the main shaft 25.

Figure 9:
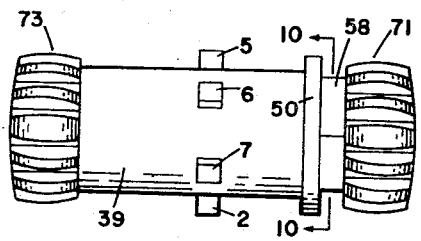
FIG. 9 is a side view of the orbiting shaft provided with the polygon shaft section.
Figure 10:
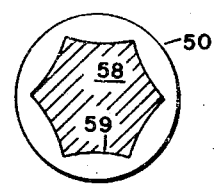
FIG. 10 is a cross-sectional view of the polygon shaft section, taken along the line 10—10 of FIG. 9.

FIGS. 7–10 show the improvement of the orbital shaft having a polygon shaft section orbiting within a polygon shaft opening. In FIGS. 7 and 9, the polygon shaft opening has seven, namely (n) number of, internal wall surface portions defining with said face wall means 53, a polygon boundry edge configuration 55 having (n) number of polygon boundry edges 56. The polygon shaft section is identified by the reference character 58 and has six, namely (n—1) number of external shaft wall surface portions 59 defining a polygon (hexigon) cross-section. The external shaft wall surface portions 59 and the internal wall surface portions 56 of the polygon shaft opening confront each other and effect a hugging confining wall relationship therebetween in successive order as the orbital shaft partakes a movement comparable to that of the rotor means 33, namely, a combined movement comprising an orbital and a rotational movement. The confining wall relationship self-locates the shaft with the male spline teeth thereon in substantially a correct timed-position with respect to the rotary valve, whereby the rotary valve is automatically self-timed with respect to the rotor means upon assembly of the rotor means on the self-located shaft and within the stator means for operation therein. In such assembly, the rotor means will not fit within the stator means for operation unless the female spline teeth are correctly indexed with respect to the self-located male teeth. In assembly, it is only necessary for the assemblyman to index the female spline teeth around the male spline teeth, trying one after the other, until the rotor means can be inserted into the stator means for operation therein. Of all the indexable position, there is only one position where the rotor means may be inserted into the stator means for operation, and that is the position where the rotary valve means is correctly timed with respect to the rotor means. In essence, the self-timing means functions as a built-in go and no-go gage, where the parts will not go together unless correct timing is effected.

The stationary valve member 29 is arranged so that it is always mounted to the end of the main body 20 in the same relative angular position, whereby the polygon sides of the polygon shaft opening always occupy the same relative position with respect to the polygon sides of the shaft. To this end, one of the four holes for the cap screws 30 may be disposed slightly out of alignment with respect to the other three holes, whereby the stationary valve member 29 may be mounted in only one position with respect to the end of the main body 20. The confining wall relationship between the hugging confronting sides of the internal and external wall means 56 and 59 need not be too close, so long as the circumferential tolerance therebetween is less than the circumferential width of a spline tooth. With this arrangement, the indexing of an incorrect spline tooth is impossible, because with an incorrectly indexed spline tooth the rotor means cannot be assembled on the self-located shaft and within the stator means for operation therein.

With reference to FIG. 3, the maximum diameter of the round hole 52, next adjacent the side 53 of the stationary valve member 29, is fixed by the physical dimensions of the stator and the rotor. For example, the orbital movement of the rotor axis 70, orbiting around the stator axis 69 defines a circle having a diameter of approximately .300 inch. The minimum dimension across the arcuate faces of the rotor teeth is approximately 1.500 inches. As the rotor orbits within the stator, the arcuate faces of the rotor teeth, where their profile edges slidably meet with the adjacent side 53 of the stationary valve member 29, will describe a seven-sided polygon sealing juncture configuration, identified by the dash-dot line 54 in FIG. 3. The round hole 52 defines a profile boundry sealing edge configuration disposed substantially centrally within the polygon sealing juncture configuration 54. With a minimum side sealing clearance of .050 inch between the polygon sealing juncture configuration and the profile boundry sealing edge configuration (round hole 52 in the stationary valve member 29), the maximum diameter of the hole 52 would be approximately 1.100 inches. This means that the maximum diameter of the wobble shaft 39 cannot be made any larger than approximately .800 inch and still maintain a sealing clearance of .050 inch to prevent fluid leakage from the operating fluid chambers to the round hole 52. The cross-section size of the wobble shaft 39 where it passes through the shaft opening, thus becomes the criteria for the amount of torque which the fluid pressure device can withstand.

The polygon boundry edge configuration 55 in FIG. 7 is disposed inwardly of, and spaced from, the polygon sealing juncture configuration 54, whereby the sealing space therebetween constitutes peripheral sealing means for sealing fluid in the operating fluid chambers of the stator-rotor mechanism upon relative movement between the stator and rotor means. The polygon shaft opening in FIG. 7, is larger than the round shaft opening in FIG. 3 to the extent that a polygon is larger than a circle subscribed therein. In other words, the polygon sides of the polygon shaft opening in FIG. 7 would be substantially tangent to a circle contained therein having a diameter substantially equal to the diameter of the hole 52 in FIG. 3. For the same reason, the polygon shaft section 58 in FIG. 7 is larger than a circular shaft section where is passes through the circular shaft opening 52 in FIG. 3. In essence, the size of the shaft where it passes through the shaft opening has been maximized to the extent that a polygon is larger than a circle contained therein. The remainder of the orbital shaft is not subject to the same confining restrictions and thus may be enlarged between the annular shoulder 50 and the male spline teeth 73 in FIG. 9. The polygon shaft section 58 is short, in a longitudinal direction, and will withstand a considerable increase in torque over that of a circular section subscribed therein. Accordingly, the present invention provides for maximizing the size of the orbital shaft at a place where the limitations arising from the geometry of the stator-rotor mechanism are the most demanding.

In FIG. 7, the polygon sides 56 for the shaft opening and the polygon faces or sides 59 for the shaft are concavely arcuate, in that they extend inwardly and form a concave contour, looking in a direction inwardly toward the reference axis of the shaft opening. With this construction, the width of the peripheral sealing band between the polygon sealing juncture configuration 54 and the polygon boundry edge 55 is substantially uniform throughout the entire perimeter.

Figure 11:
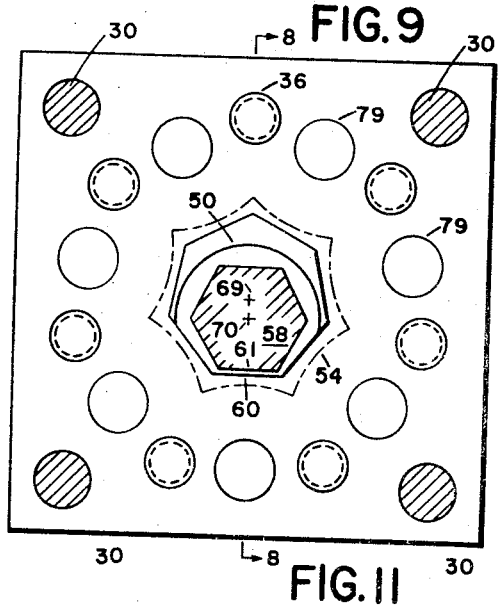
FIG. 11 is a view similar to FIG. 7, showing straight polygon sides for the shaft and for the shaft opening.

FIG. 11 is a modification of FIG. 7, in that the shaft opening has straight polygon boundry edges 60 and that the shaft has straight polygon sides 60, that is flat faces. With straight polygon sides 60 for the shaft opening, the width of the peripheral sealing band becomes greater in the vicinity of the corner apexes of the polygon shaft opening.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Stator-rotor mechanism including stator and rotor means and a shaft connected to said rotor means, said stator means having a stator axis and (n) number of internal teeth, said rotor means having a rotor axis disposed for orbital movement about said stator axis and having (n—1) number of external teeth intermeshing with said internal teeth of said stator means, said rotor means being also disposed for rotational movement about its own rotor axis, whereby said rotor means has a combined rotor movement comprising said orbital and rotational movements, said intermeshing teeth upon relative movement therebetween defining operating fluid chambers, said stator and rotor means respectively having stator and rotor side face means disposed substantially in the same plane, side member means having face wall means held in facing relation to said stator and rotor side face means, said rotor external teeth having profile edge means slidably engaging said face wall means and slidably defining therewith a polygon sealing juncture configuration having ($n$) number of polygon sealing edges, said side member means having a polygon shaft opening with a reference axis substantially in axial alignment with said stator axis, said shaft having a shaft portion extending through said shaft opening and having an operative connection with said rotor means, said shaft portion having a combined shaft movement partaking that of said combined rotor movement and including an orbital movement about said reference axis of said shaft opening, said polygon shaft opening having ($n$) number of internal wall surface portions defining with said face wall means a polygon boundry edge configuration having ($n$) number of polygon boundry edges, said polygon boundry edge configuration being disposed inwardly of and spaced from said polygon sealing juncture configuration, whereby the sealing space therebetween constitutes peripheral sealing means for sealing fluid in said operating fluid chambers upon relative movement between said stator and rotor means.

2. The structure of claim 1, wherein said shaft portion has ($n-1$) number of external shaft wall surface portions defining a polygon cross-section, said external shaft wall surface portions confronting said internal wall surface portions of said polygon shaft opening and effecting a confining wall relationship therebetween in successive order as said shaft moves through said combined shaft movement.

3. The structure of claim 1, wherein said operative connection between said shaft and said rotor means comprises female spline teeth within said rotor means and male spline teeth on said shaft.

4. The structure of claim 3, wherein said side member means has laterally extending wall means and wherein said shaft has abutment means extending outwardly therefrom and engageable with said laterally extending wall means to limit relative axial movement between said male and female spline teeth.

5. The structure of claim 3, wherein said side member means has an inner annular recess having opposed laterally extending wall means and wherein said shaft has abutment means extending outwardly therefrom and engageable with at least one of said opposed laterally extending wall means to limit relative axial movement between said male and female spline teeth.

6. The structure of claim 3, having rotary valve means driven by said shaft for controlling the entrance of fluid to and the exit of fluid from said operating fluid chambers, said shaft portion having ($n-1$) number of external wall surface portions defining a polygon cross-section and confronting said ($n$) number of internal wall surface portions of said polygon shaft opening and effecting a confining wall relationship therebetween in successive order as said shaft moves through said combined shaft movement, said confining wall relationship self-locating said shaft and said male spline teeth thereon in substantially a correct timed-position with respect to said rotary valve means, whereby said rotary valve means is automatically self-timed with respect to said rotor means upon assembly of said rotor means on said self-located shaft and within said stator means for operation therein.

7. The structure of claim 1, wherein said polygon boundry edges are concavely arcuate.

8. The structure of claim 1, wherein said polygon boundry edges are substantially straight.

9. The structure of claim 7, wherein said shaft portion defines a polygon cross-section with concavely arcuate faces.

10. The structure of claim 8, wherein said shaft portion defines a polygon cross-section with substantially flat faces.

11. The structure of claim 1, wherein said shaft has first and second male spline teeth provided thereon with said teeth axially spaced apart from each other, said shaft having thereon an annular shoulder intermediate said male spline teeth, said shaft having a polygon cross-section intermediate said first male spline teeth and said annular shoulder and having a circular cross-section intermediate said second male spline teeth and said annular shoulder.

12. The structure of claim 1, wherein said annular shoulder has a greater cross-sectional area than that of either said polygon cross-section or said circular cross-section.

References Cited
UNITED STATES PATENTS 3,405,603 10/1968 Woodling _____ 91—56
3,452,680 7/1969 White _____ 103—130

EVERETTE A. POWELL, JR., Primary Examiner